Feb. 14, 1933.  R. C. BATEMAN  1,897,949
AIR BAG CONNECTION
Filed July 21, 1928
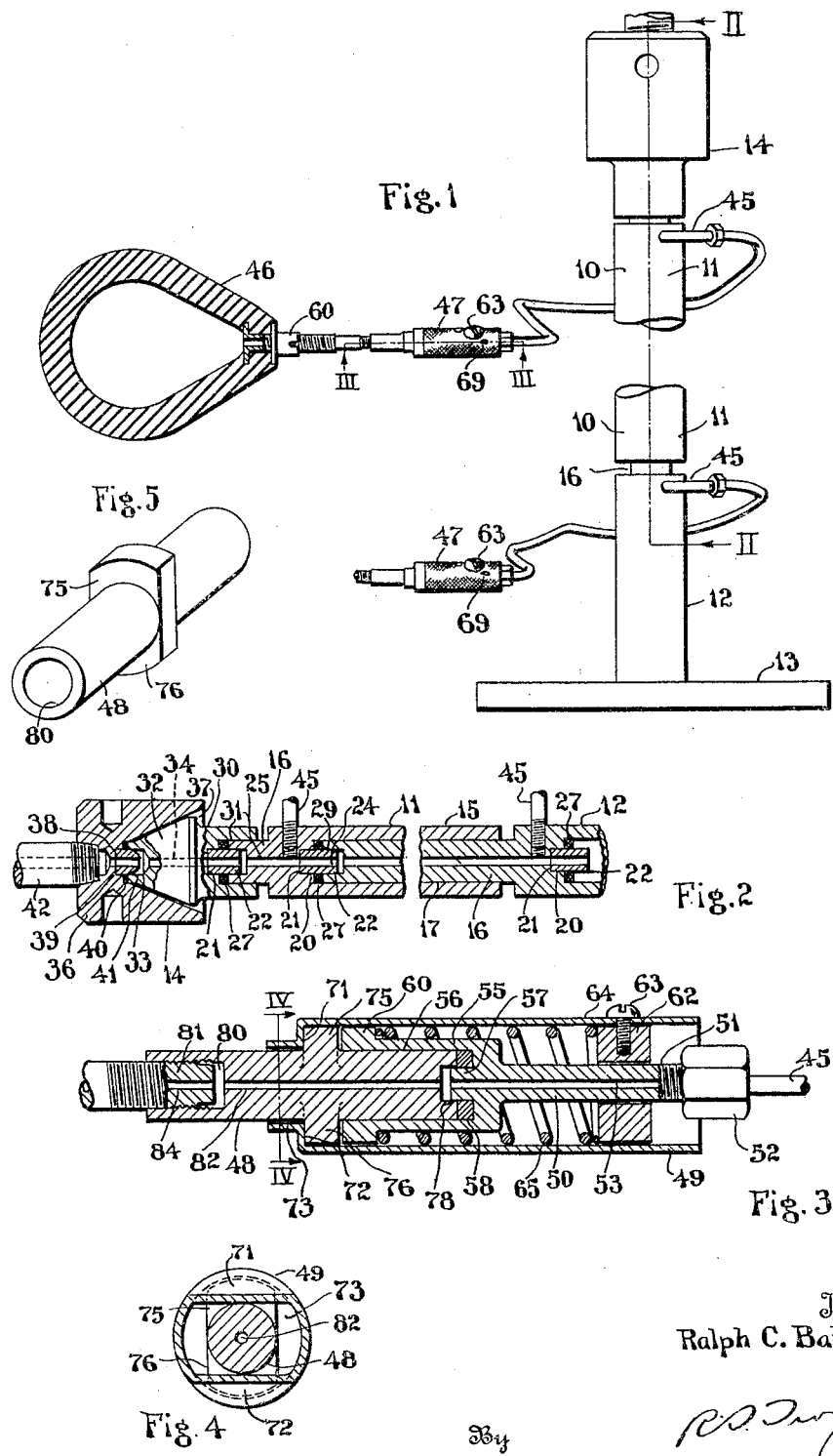
Inventor
Ralph C. Bateman Patented Feb. 14, 1933

1,897,949

UNITED STATES PATENT OFFICE

RALPH C. BATEMAN, OF AKRON, OHIO, ASSIGNOR TO WINGFOOT CORPORATION, OF WILMINGTON, DELAWARE, A CORPORATION OF DELAWARE

AIR BAG CONNECTION

Application filed July 21, 1928. Serial No. 294,560.

This invention relates to the curing of pneumatic tires and it has particular relation to those connections employed between the air bag forming the core of a tire, and a source of supply of fluid under pressure.

The object of the invention is to provide a quickly releasable connection which is fluid tight under operative conditions.

In the process of curing a pneumatic tire, fluid under pressure is supplied to an air bag forming the core of the tire, so that the tire will be molded to a certain required contour, while being cured. Usually a plurality of tires are cured simultaneously in a single cylindrical vulcanizing receptacle. Annular molds are arranged in superimposed relation, and a fluid transmitting unit is located centrally of the molds. In order that the fluid transmitting unit will not interfere with the movement of the molds into and from the receptacle, it is formed of telescopically connected sections, equal in number to the number of molds. Thus, as a mold is positioned in the receptacle, a corresponding section of the unit is added. To transmit the fluid to the air bags, a releasable connection is provided between each bag and a corresponding section of the unit.

Heretofore, one of the principal disadvantages of such arrangements resided in the difficulty of maintaining the connections fluid-tight during the period of vulcanization. This naturally affected the efficiency of the curing operation, because in vulcanizing a pneumatic tire, maintenance of a predetermined pressure in the air bag is essential. Moreover, frequently parts of the connections had to be replaced, resulting in a delay of operation and adding expense to the normal cost thereof.

This invention, to a large extent, obviates the difficulties heretofore encountered in connections of the type referred to, since fewer replacements have been found to be necessary and the connections remain fluid-tight for a longer period, thereby insuring correct pressures in the air bags.

For a better understanding of the invention, reference may now be had to the accompanying drawing, forming a part of this specification, in which:

Figure 1 is an elevational view, partly cross-sectional, showing two of the connections between the air bags and the sectional fluid pressure unit.

Figure 2 is a cross-sectional view, taken substantially along the line II—II of Figure 1;

Figure 3 is a cross-sectional view, on a larger scale, taken substantially along the line III—III of Figure 1;

Figure 4 is a cross-sectional view, taken substantially along the line IV—IV of Figure 3; and Figure 5 is a perspective view of one of the elements shown by Figure 3.

Referring to Figure 1, a unit 10, comprising a plurality of telescoping sections, two of which are indicated at 11 and 12, is mounted upon a base 13 which is adapted to rest upon the bottom of a vulcanizing receptacle (not shown). Fluid under pressure is supplied to the unit by means of a connection 14 between the upper section and a source of fluid maintained under pressure. Each of the sections comprises an enlarged cylindrical portion 15 and a reduced cylindrical portion 16. A socket 17, formed in the portion 15, is of such diameter that the reduced portion 16 of one section is adapted to receive telescopically the reduced portion 16 of an adjacent section. In this manner, the unit may be built to a length corresponding to the height of the vulcanizing receptacle.

In the base 20 of the socket 17, a smaller socket 21 is formed, which receives a bushing 22. This bushing is provided with a central, longitudinal aperture 24 registering with an opening 25 in the reduced cylindrical portion 16. Thus, an opening is formed through each section for the transmission of fluid under pressure. Each bushing 22 has a gasket 27 disposed thereabout, which normally rests against the base of the socket 17. At its outer end, the reduced cylindrical portion 16 has a socket 29 which is adapted to receive one of the bushings 22. In assembled relation, the reduced end of one section telescopes into the enlarged end of an adjacent section. In the construction illustrated, the bushing 22 is separate from the sections, but it is apparent that it may be formed integral either with the base of the socket 17 or with the end of the reduced portion 16.

The connection 14 between the upper section 11 of the stack 10, and a source of fluid supply, includes a member 30 having a socket 31 in one end, identical with the socket 29 in the stack section 11, and in which is disposed the reduced end 16 of that section. At its other end, the member 30 is in the form of a truncated cone 32, having its smaller base bored as indicated at 33. Between the bore 33 and the socket 31, a longitudinal aperture 34 is provided which communicates with the aperture 25 in the section 11 of the stack 10. A cap 36, having a conical opening 37, receives the conical portion 32 of the member 30. The base of the opening 37, similarly to the socket 31 in the member 30, has a bushing 38 seated centrally thereof, around which a gasket 40 is encircled. This bushing 38 differs from the bushings 22 in the section 11 of the stack, in that its outer edge is beveled, as indicated at 41, to facilitate the seating of the conical portion 32 in the opening 37. Connection between the cap 36 and a source of supply of fluid under pressure is formed by means of a tube 42 screw-threaded into the cap.

Each of the sections 11 and 12 has a flexible tube 45 screw-threaded thereinto and communicating with the opening 25. The other ends of the tubes are connected to air bags 46 (only one being shown), by means of releasable connections 47, in order that the air bags may be connected to and released from their corresponding sections of the unit 10.

Referring particularly to Figure 3, one of the connections 47 that is illustrated in detail, comprises essentially an adapting member 48, a sleeve or housing 49, and a plunger 50. The plunger is reduced at one end, as indicated at 51, and is connected to the tube 45 by a nut 52, or in any other suitable manner. A passageway 53, in the plunger, communicates with the opening in the tube. The larger end 55 of the plunger is provided with a socket 56, having an annular shoulder 57 projecting from the inner extremity thereof, about which a gasket 58 is encircled. Upon its outer periphery, the end 55 has a flange 60 formed adjacent one end thereof. This flange slidably engages the inner surface of the sleeve 49, whereas the reduced portion 51 freely passes through a collar 62, secured rigidly adjacent one end of the sleeve by a screw 63, which passes through an opening 64 in the sleeve and is threaded into the collar. In order to provide for an adjustment of the collar, a plurality of such openings 64 are provided, into any one of which the screw 63 selectively may be engaged.

A spring 65, having one end engaging the collar 62, surrounds the plunger and has its other end abutting the flange 60, so that the plunger is urged toward the end of the sleeve opposite the collar. The sleeve is crimped to form a pair of shoulders 71 and 72 which define a slot 73 extending diametrically across the end of the sleeve. One of the purposes of the shoulders 71 and 72 is to prevent the plunger from being moved out of the sleeve by the expansion of the spring 65.

The adapting member 48 is of such diameter that it freely moves through the slot 73 in the sleeve, and has intermediately of its ends, diametrically opposite projection 75 and 76, also movable through the slot. After moving the projections 75 and 76 through the slot, turning of the adapting member about its longitudinal axis, will move the projections 75 and 76 into engaging relation with the shoulders 71 and 72. In the latter engaged position, the inner end of the adapting member projects into the socket 56 of the plunger 49 and abuts the gasket 58 therein. A socket 78, formed in the inner end of the adapting member, receives the central projection 57 of the plunger.

From the foregoing, it will be apparent that with the adapting member engaged with the plunger, the spring 65 acts to maintain them in this relation, because it urges the flange 60 against the shoulders 75 and 76 of the adapting member and the latter against the shoulders 71 and 72 of the sleeve. Since the tension of the spring may be adjusted by means of the screw 63, the pressure between the plunger and adapting member may be regulated to meet the requirements of different conditions of fluid pressure.

In the outer end of the adapting member, an internally screw-threaded socket 80 is provided to receive the threaded end 81 of the stem of the air bag 46. A central aperture 82, formed in the adapting member, communicates with an aperture 84 in the stem of the air bag, and further communicates with the aperture 53 in the plunger. Consequently, a communicating passageway exists between the air bag and the central opening 25 formed in the sections of the unit 10.

In the operation of the construction described, a mold is positioned in the vulcanizing receptacle, and one of the sections 11 of the central unit is joined in telescoping relation to the section beneath it, in the manner previously described. Thereafter, the adapting member 48, secured to the stem of the air bag, is inserted into the sleeve 49 and turned until the projections 75 and 76, and the shoulders 71 and 72, abut each other. Because of the action of the spring 65, the plunger and adapting member are held securely in this engaged relation. To release the connection, it is only necessary to turn the adapting member until the projections 75 and 76 register with the slot 73, whereupon the projections 75 and 76 are moved through the slot 73 by the spring.

It will be apparent from the foregoing description that there has been provided a simple and readily releasable connection between the central sectional unit and the air bag in the mold. The connection, in operation, is fluid tight and it is necessary to replace gaskets, etc., only at infrequent intervals. A constant pressure therefore is insured in the air bag which is of considerable importance in the proper curing of pneumatic tires. Furthermore, much time is saved by the ease and rapidity with which the connection may be assembled and disassembled. It will be apparent also that the sections of the central unit form a fluid tight assembly for transmitting fluid pressure to the air bags. In all of the connections, few parts are required and, therefore, there is less likelihood of the failure of the connections during their operation.

Although I have illustrated only the preferred form which my invention may assume and have described that form in detail, it will be apparent to those skilled in the art that the invention is not so limited, but that various modifications may be made therein without departing from the spirit of the invention or from the scope of the appended claim.

What I claim is:

A releasable connection comprising a longitudinally apertured elongate member having an enlarged portion adjacent one end, said enlarged portion having a socket larger than the aperture, an apertured plug projecting outwardly from the base of the socket, a gasket encircling the plug, the free end of the enlarged portion having a shoulder on its outer surface, a cylindrical sleeve enclosing the apertured member and having a collar secured therein adjacent one end, the smaller portion of the apertured member slidably projecting through the collar, a spring encircling the apertured member and abutting at its ends the shoulder on the member and the collar secured in the end of the sleeve respectively, the end of the sleeve adjacent the enlarged portion of the apertured member having an elongate diametrically extending opening, a second longitudinally apertured member having diametrically opposed shoulders adapted to be projected through the opening in the end of the sleeve, and thereafter turned in order to secure the member in the sleeve against accidental removal, said last mentioned apertured member having a portion projecting into the socket of the first mentioned apertured member and abutting the gasket.

In witness whereof, I have hereunto signed my name at Akron, in the county of Summit and State of Ohio, U. S. A., this 20th day of July, 1928.

RALPH C. BATEMAN.